United States Patent
Chang (12)

(10) Patent No.: US 6,294,501 B1
(45) Date of Patent: Sep. 25, 2001

(54) SPECIAL ADSORBENT FOR CARBON DIOXIDE ACQUISITION ON MARS

(75) Inventor: Chin-Hsiung Chang, Palatine, IL (US)

(73) Assignee: AlliedSignal Inc., Morristown, NJ (US)

( * ) Notice: Subject to any disclaimer, the term of this patent is extended or adjusted under 35 U.S.C. 154(b) by 0 days.

(21) Appl. No.: 09/261,046

(22) Filed: Mar. 2, 1999

Related U.S. Application Data (60) Provisional application No. 60/077,253, filed on Mar. 9, 1998, and provisional application No. 60/077,491, filed on Mar. 11, 1998.

(51) Int. Cl.⁷ .................................................... B01J 20/20
(52) U.S. Cl. ........................ 502/418; 423/445 R; 502/416
(58) Field of Search ..................................... 502/416, 418, 502/423, 437; 423/445 R; 95/139; 264/29.7

(56) References Cited

U.S. PATENT DOCUMENTS

| | | |
|---|---|---|
| 4,810,266 | 3/1989 | Zinnen et al. . |
| 4,820,681 | 4/1989 | Chang et al. . |
| 5,098,880 * | 3/1992 | Gaffney et al. ....................... 423/445 |
| 5,461,023 | 10/1995 | Chang et al. . |
| 5,599,764 * | 2/1997 | Sharma et al. ....................... 502/417 |
| 5,972,834 * | 10/1999 | Ohsaki et al. ....................... 502/416 |

OTHER PUBLICATIONS

Finn, John E., *Utilisation of Martian Atmosphere Constituents by Temperature–Swin Adsorption*, Journal of the The British Interplanetary Society, vol. 49, pp. 423–430, 1996.

* cited by examiner

*Primary Examiner*—Stuart L. Hendrickson
(74) *Attorney, Agent, or Firm*—William J. Zak, Jr.

(57) ABSTRACT

A carbon dioxide adsorbent comprises a carbonized, shaped precursor material, with such material being characterized by a total micropore volume of at least about 0.525 cm³/g and a median pore diameter of at least about 0.439 nm, whereby the material has a carbon dioxide capacity of at least about 28.6% g/g at a carbon dioxide partial pressure of about 6 mm Hg and a temperature of about 196° K. Also provided is a method of making a carbon dioxide adsorbent, which includes the steps of polymerizing a monomer to produce a precursor material; shaping the precursor material to produce a shaped precursor material; and carbonizing the shaped precursor material to produce the adsorbent, whereby the adsorbent is characterized by a carbon dioxide capacity of at least about 28.6% g/g at a carbon dioxide partial pressure of about 6 mm Hg and a temperature of about 196° K.

26 Claims, 6 Drawing Sheets

FIG. 1A  EXAMPLE 5 AT 196° K

FIG. 1B  PORE SIZE DISTRIBUTION OF EXAMPLE 5

FIG. 2A  EXAMPLE 6 AT 196° K

FIG. 2B  PORE SIZE DISTRIBUTION OF EXAMPLE 6

FIG. 3A EXAMPLE 7 AT 196° K

FIG. 3B PORE SIZE DISTRIBUTION OF EXAMPLE 7

FIG. 4A  EXAMPLE 8 AT 196° K

FIG. 4B  PORE SIZE DISTRIBUTION OF EXAMPLE 8

FIG. 5A EXAMPLE 13 AT 196, 298, AND 423°K

FIG. 5B PORE SIZE DISTRIBUTION OF EXAMPLE 13

FIG. 6A EXAMPLE 14 AT 196, 273 323 & 523°K

FIG. 6B PORE SIZE DISTRIBUTION OF EXAMPLE 14

SPECIAL ADSORBENT FOR CARBON DIOXIDE ACQUISITION ON MARS

CROSS-REFERENCE TO RELATED APPLICATIONS

The present application claims the benefit of U.S. Provisional Application Ser. Nos. 60/077,253 and 60/077,491, respectively filed Mar. 9, 1998 and Mar. 11, 1998.

BACKGROUND OF THE INVENTION

The present invention generally relates to adsorbents for carbon dioxide and, more specifically, to an improved adsorbent for carbon dioxide that can be particularly useful in environments having a highly concentrated but low partial pressure of carbon dioxide.

Future space exploration requires the ability to process resources available locally for the life support system of astronauts and for the propellant material that will send the astronaut and/or equipment back to Earth. On the surface beyond Earth, there may be highly concentrated but low partial pressure of carbon dioxide. The carbon dioxide can be a source of oxygen and propellant component for human habitat and the return of astronaut and equipment. For the application of this unique resource, the first step is the acquisition and concentration of carbon dioxide. One method to accomplish the first step is the adsorption of carbon dioxide during night time when there is low temperature and $CO_2$ partial pressure. Next is the desorption/recovery of carbon dioxide during day time when there is higher temperature and to produce $CO_2$ of high pressures. Such a diurnal cycle is described, for example, in Finn et al., "Utilisation of Martian Atmosphere Constituents by Temperature-Swing Adsorption," Journal of The British Inerplanetary Society, Vol 49, pp. 423–430, 1996.

A key to the success of the above adsorption/desorption technique is the working capacity of the adsorbent. Conventional adsorbents for the adsorption of carbon dioxide have been zeolite materials, such as 13X and 5A. These adsorbent materials are inorganic oxides that also adsorb water. Zeolites have been shown to have an adsorption capacity of 13% at 196° K (which approximates the night time temperature of some environments). However, the binding energy of the carbon dioxide on the zeolite is high. To remove the carbon dioxide from the zeolite at a carbon dioxide partial pressure of 810 mm Hg (which approximates the pressure required for subsequent $CO_2$ processing), a temperature of 523° K with a residual carbon dioxide capacity of 2% is required. This results in a working capacity of only 11% at a desorption temperature of 523° K. Such a low working capacity requires a large quantity of adsorbent for in-situ propellant production. Yet, weight, volume and energy are critical issues in the use of any equipment for space exploration.

In an effort to overcome disadvantages presented by a zeolite adsorbent, carbon-based materials have been used. For example, in U.S. Pat. No. 4,820,681 which is assigned to the assignee of the present invention, a carbon molecular sieve was prepared by polymerizing a cross-linking agent and a precursor monomer to produce a cross-linked polymer. The cross-linked polymer was then shaped into a desired configuration without the need for a binder. The shaped polymer was then carbonized.

In a fashion related to the above patent, U.S. Pat. No. 4,810,266 which is also assigned to the assignee of the present invention discloses a carbon molecular sieve. The sieve is similarly prepared by polymerizing a cross-linking agent and precursor monomer. The cross-linked polymer that is produced was also shaped into a desired configuration and carbonized. However, the pores of the material were then enlarged by steam treatment. And the material was given an amine functionality that improved capacity upon regeneration of the material.

While the above art has provided advantages, it has not adequately addressed the importance of adsorbent characteristics such as pore size, micropore volume and pore size distribution. These characteristics are important because carbon dioxide adsorption on solid adsorbents is based on the interaction forces between the gaseous molecule and the surfaces on micropores in the adsorbent.

As can be seen, there is a need for an improved adsorbent for carbon dioxide. There is also a need for an adsorbent for carbon dioxide that can be particularly useful in environments having a highly concentrated but low partial pressure of carbon dioxide. A further need is for a carbon dioxide adsorbent that has increased working capacity, especially at temperatures of around 196° K and 423° K which respectively represents an environmental night time temperature and a day time temperature. Similarly, a carbon dioxide adsorbent is needed that has increased working capacity at carbon dioxide partial pressures of around 6 mm Hg and 810 mm Hg—the approximate night time and process partial pressures in certain environments. Another need is for a carbon dioxide adsorbent for use in a diurnal cycle system wherein carbon dioxide is adsorbed and then desorbed.

SUMMARY OF THE INVENTION

A carbon dioxide adsorbent according to the present invention comprises a carbonized, shaped precursor material, with such material being characterized by a total micropore volume of at least about 0.525 $cm^3/g$ and a median pore diameter of at least about 0.439 nm, whereby the material has a carbon dioxide capacity of at least about 28.6% g/g at a carbon dioxide partial pressure of about 6 mm Hg and a temperature of about 196° K.

A method of making a carbon dioxide adsorbent comprises the steps of polymerizing a monomer to produce a precursor material; shaping the precursor material to produce a shaped precursor material; and carbonizing the shaped precursor material to produce the adsorbent, whereby the adsorbent is characterized by a carbon dioxide capacity of at least about 28.6% g/g at a carbon dioxide partial pressure of about 6 mm Hg and a temperature of about 196° K.

These and other features, aspects and advantages of the present invention will become better understood with reference to the following drawings, description and claims.

DETAILED DESCRIPTION OF THE INVENTION

While the embodiments of the present invention are described below in the context of utilization in outer space, the scope of the present invention is not so limited. The present invention can be used in other atmospheric environments, such as those where the atmospheric gases include nitrogen, water, and oxygen. For example, it may be desirable to remove carbon dioxide from enclosed life support systems or vehicles such as submarines, aircraft, and spacecraft. The need to remove carbon dioxide from a gas can also be due to the dictates of industrial or chemical processes that require low levels of carbon dioxide. Therefore, the present invention can be useful in generating high-purity oxygen for use in a chemical reaction or analysis.

In general, the present invention provides a carbon dioxide adsorbent in the form of carbon molecular sieves (CMS). The CMS may be thought of as an analog to conventional inorganic molecular sieves and is selective for the separation of one normally gaseous compound or molecule from another. The adsorbent according to the present invention is characterized by, among other things, a preferred total micropore volume, median pore diameter, pore size distribution, BET surface area, Langmuir surface area, and resulting carbon dioxide capacity. A method of making the adsorbent of the present invention is accomplished by the steps of (1) synthesizing a precursor material by polymerizing an oxygen-free monomer—whether in the presence or absence of an oxygen-free cross-linking agent; (2) optionally forming or shaping particles of the precursor material into a desired shape; and (3) carbonizing the shaped material in a substantially oxygen-free environment.

In more specifically describing the steps or acts of the present invention, the monomer used in the synthesizing step can be chosen from a number of different monomers that have characteristics rendering them suitable for the present method. Basically, the monomers should be readily polymerizable, essentially free of oxygen in their molecular structure and preferably comprised basically of hydrogen, a halogen, and carbon. Among the materials which may be employed as the monomer are acrylonitrile (AN), vinylidene fluoride (VDF), chlorotrifluoroethylene (HALAR), vinylidene chloride (VDC), mixtures of two or more monomers such as mixtures of vinylidene chloride and vinyl chloride, vinylidene chloride and acrylonitrile, and a mixture of styrene and divinylbenzene. Other suitable monomers include vinyl fluoride, vinyl bromide, chlorinated ethylene, chlorofluorinated ethylene, vinyl-chlorobenzene, vinylidene bromide and vinylidene-fluoride-chlorotrifluoroethylene. The preferred monomer for utilization in the present invention is vinylidene chloride because of its capability to produce precursor material that forms desirable CMS upon carbonization.

The step or act of polymerizing in the present invention may be performed according to a number of different procedures known in the art. The various types of polymerization referenced herein are defined in accordance with Volume 16 of the Second Edition of the *Kirk-Othmer Encyclopedia of Chemical Technology*. For "suspension polymerization," a monomer is dispersed rather than dissolved in a medium with water being the typical suspension medium. In suspension polymerization, an initiator is dissolved in the monomer, the monomer is dispersed in water, and a dispersing agent is incorporated to stabilize the suspension formed. The monomer droplets are generally on the order of approximately 0.1–1.0 mm in size. In "emulsion polymerization," the polymerization is within a suspended particle of colloidal size of approximately 50 to 1500 Angstroms in diameter. An initiator is normally found in the aqueous phase and not within the monomer.

"Bulk polymerization" is the direct conversion of liquid monomer to polymer in a reaction system in which the polymer remains soluble in its own monomer. To deal with the problems of removing the exothermic heat of polymerization, this type of polymerization is often terminated at relatively low conversions of 40–60% and excess monomer distilled off for use in subsequent polymerization. "Solution polymerization" is where a solvent is used to dissolve the monomer, the polymer, and a polymerization initiator. It is believed that precipitation polymerization and vapor phase polymerization would also be suitable for the subject invention. Preferably, suspension polymerization is used in the present invention because of its relative ease in the control of final precursor particle size, density and other characteristics.

Since it is desired that the produced polymers have a non-oxygen functionality, the polymerization initiator used in the suspension polymerization is preferably an oxygen-free compound. Therefore, a carbon or azo compound—rather than an oxygen-containing initiator—is preferably used. One suitable initiator is 2,2'-azobisisobutyronitrile (AIBN) which has a molecular formula of $C_8H_{12}N_4$. Lauroyl peroxide is also useful. Another suitable polymerization initiator is 2,2'-azobis (2,4-dimethylvaleronitrile) which is available from DuPont Chemical Company and sold under the tradename VAZO 52. The formula of the latter compound is $C_{14}H_{24}N_4$.

If the precursor polymer is produced by solution polymerization, a number of different solvents may be employed. Desired characteristics in the solvent include a high-solubility for the monomer, the absence of oxygen from the molecular structure, and a large difference in boiling point between the solvent and the monomer. Useful solvents include normal hexane, chloroform, carbon tetrachloride, orthodichlorobenzene, and 1,1,2,2,-tetrachloroethane. A weight ratio between monomer and solvent of about 1:1 to 1:2 will normally be suitable.

The preferred suspension polymerization can be carried out in an aqueous solution containing one or more of various dispersing agents such as hydroxypropyl cellulose and hydroxypropyl methyl cellulose. With (AIBN) or lauroyl peroxide being the preferred catalyst, the polymerization reaction should be controlled by temperature and agitation at 70–100 rpm to achieve a desired particle size and particle density of the resulting polyvinylidene chloride (PVDC). For example, if AIBN is used, reactor temperature can be increased to about 70° C. and reaction time can be about 8 hours. Thereby, a product yield of about 65% can be obtained. The particle size can be about 200 to 800 micrometers.

With lauroyl peroxide as the catalyst, several heating steps should preferably be employed, such as: (1) heating the reactor temperature from about 25 to 51° C. over a period of about 2–4 hours; (2) maintaining the reactor temperature at about 51° C. for about 13 hours; (3) increasing the temperature to about 58° C. over about 30 minutes; (4) maintaining the temperature at about 58° C. for about 5.5 hours; (5) increasing the temperature to about 64° C. over about 30 minutes; (6) maintaining the temperature at about 64° C. for about 2.5 hours; (7) increasing the temperature to about 70° C. over about 30 minutes; and (8) maintaining the temperature at about 70° C. for about 1.5 hours. With the above procedure, a product yield >96% can be obtained. The resulting PVDC polymer can then be washed and dried at about 80° C. A particle size of about 20–400 micrometers can be obtained.

Optionally, the polymers produced in the polymerization step can be cross-linked with a substantially oxygen-free cross-linking agent. The cross-linking agent can typically be present during polymerization at a concentration equal to less than about 10 mole percent of the monomer. A preferred cross-linking agent is divinylbenzene. Other cross-linking agents which are contemplated for use in the present method include trivinyl benzene, divinyl acetylene, and divinyl sulfide.

Whether cross-linked or not, the precursor material formed during the polymerization step may be in a number of different forms, such as one or more large masses or a large number of smaller particles. For ease in fabricating the polymer into a desired shape, the polymer is preferably ground, pulverized, shredded, or in some way reduced in size to small free-flowing granules or powder. The granules or powder—or even the bulk material resulting from the initial polymerization—are then shaped or formed into a desired configuration such as a cylinder, sphere, rod, flat sheet, porous or perforated sheet, extruded honeycomb or monolith, pellets, etc. In this embodiment, pellets are preferred. This shaping or forming may be done by conventional means. For instance, the powder may be put into a press and pressurized until it will retain a desired shape. Alternatively, the resultant material may be warmed and extruded into a desired form, such as a cylinder.

Preferably, the precursor material in the form of particles resulting from the suspension polymerization is ground. Grinding can be conducted with dried powder or in a water suspension. The later method is preferred due to the ability of water to serve as a heat sink and reduce the rise in temperature during grinding. Ice can be added to the suspension in order to further reduce the temperature. Next, it is preferred that the polymer particles of about 4 to 100 micrometers are selected because of ease in fabricating into a desired shape without excessive pressures. The selected particles can then be pelletized with a commercial pelletization unit without any pellitization aid to hold particles together. A pellet of about 0.12 inches in diameter and about 0.12 inches in length is preferred due to needs in forming the final adsorbent with high packing density and low pressure drop. Because of the requirement to achieve high packing density for the resulting adsorbent, a preferred pellet density is about 0.9 to 1.2 g/cm$^3$.

The shaped polymeric material is then subjected to a carbonization procedure. This procedure basically consists of heating the shaped material to a high temperature in the presence of an inert gas such as nitrogen or helium. This carbonization is performed in an essentially oxygen-free environment. That is, the concentration of oxygen in the atmosphere surrounding the particles undergoing carbonization should be less than about 0.1 mole percent and is preferably less than 0.05 mole percent. The carbonization will result in the evolution of a hydrogen halide. Preferably, flowing inert gas is used at a sufficient rate to remove this material from the particles. However, it has been found that the removal of the hydrogen halide is not necessary to the production of suitable finished material by the subject method.

Prior to high temperature carbonization, the shaped polymer precursor material is preferably subjected to a mild heating step during which its temperature is raised to at least about 165° C. and preferably to about 210° C. The shaped precursor is then held at this temperature until no more weight loss occurs. The pellets or other form of shaped material are then preferably subjected to a stepped temperature increase to a temperature of at least about 710° C. and preferably to about 810° C. The temperature of the shaped precursor material can be raised in temperature at a rate of about 50–200° C. per hour. Preferably, it is raised at about 98° C. per hour. Also, it is desirable to hold the shaped material at the final high temperature from about 2 to 7 hours and preferably for about 2 hours. The required holding period can be determined by weight loss measurements.

A shaped mass of polymeric material can shrink during the carbonization step. The shrinking will tend to occur in a proportional manner along each dimension. The amount of shrinkage is also proportional to the amount of weight loss caused by the driving off of the hydrogen halide from the shaped polymer. The shaped pellet can lose approximately 70 percent of its weight and size during the carbonization procedure due to the evolution of hydrogen chloride, hydrogen bromide, or hydrogen fluoride or a mixture of these gases.

If no specific shape is desired, the shaping step may be deleted and particles of a desired size may be carbonized. Alternatively, large masses of polymer may be carbonized and then crushed and sized, such as with screens, although this procedure generally results in the production of considerable waste in the form of off-size particles.

The hydrophobic nature of the CMS prepared according to the present invention allows carbon dioxide removal to be achieved without the prior passage of air being treated for the removal of normally expected amounts of water vapor. Carbon dioxide removal from air may be accomplished by passing the air at a slight pressure or at an ambient pressure through an active bed of the CMS and at adsorption-promoting conditions. Two or more beds may be employed on a swing bed system to provide continuous removal of carbon dioxide. The adsorbed carbon dioxide may then be recovered from the CMS by conventional means such as by depressurization, heating, or a combination of these two methods which regenerates the material and returns it to an active or unsaturated form.

EXAMPLE 1

For the synthesis of a precursor material according to the present invention, 140.6 g (107.1 ml) of a commercial vinylidene chloride (VDC) was contacted with 40 ml of PCB activated carbon (20×50 mesh) to remove the inhibitor in the VDC. To this purified VDC, 0.14 1 grams of azobisisobutyronitrile (AIBN) were dissolved. An aqueous solution of 5 grams of hydropropyl methyl cellulose and 811.3 grams of distilled water (DI) was prepared separately. 140.74 grams of the VDC containing AIBN were added slowly with agitation (70 rpm) to 703.03 grams of the aqueous solution in a 1-gallon glass-lined reactor. The temperature of the reactor was increased to 70° C. and held for 8 hours. The pressure was increased to 30 psig.

At the end of the reaction, the polyvinylidene chloride (PVDC) product was washed with 20 times the volume of the product mixture and dried in air. A yield of 65% was obtained.

EXAMPLE 2

For the systhesis of another PVDC precursor material, an aqueous solution was prepared by dissolving 50.0 g of Methocel (hydroxypropyl methyl cellulose) in 101,070 g of DI water in a 50-gallon reactor. A catalyst initiator solution was prepared by dissolving 102.2 g of lauroyl peroxide in one liter of VDC (inhibitor removed). The initiator solution and additional VDC (inhibitor removed) were mixed to give a total of 40,870 grams of VDC, which was then mixed with the aqueous solution in a 50-gallon reactor agitated at 75 rpm. The reaction temperature program described above for lauroyl peroxide was used.

A total of 39,662 grams of PVDC with particle sizes ranging from 20 to 400 micrometers was obtained.

EXAMPLE 3

The precursor prepared according to Example I was ground with a commercial grinder in solid form and with a final particle size of 4–100 micrometers. The fine particle was pelletized to the following geometry and density:

TABLE 1

| Precursor Pellet | | | | |
| --- | --- | --- | --- | --- |
| Pellet # | Diameter (mm) | Length (mm) | Weight (g) | Density (g/cm$^3$) |
| 1 | 3.200 | 3.08 | 0.0258 | 1.04 |
| 2 | 3.200 | 3.05 | 0.0257 | 1.05 |
| 3 | 3.180 | 3.08 | 0.0263 | 1.08 |
| 4 | 3.110 | 3.11 | 0.0269 | 1.14 |
| 5 | 3.200 | 3.02 | 0.0256 | 1.05 |
| 6 | 3.180 | 3.11 | 0.0258 | 1.04 |
| 7 | 3.150 | 3.02 | 0.0257 | 1.09 |
| 8 | 3.150 | 2.95 | 0.0255 | 1.11 |
| 9 | 3.110 | 3.00 | 0.0253 | 1.11 |
| 10 | 3.15 | 3.00 | 0.0252 | 1.08 |
| Average | 3.16 | 3.04 | 0.0258 | 1.081 +/- 0.032 |

EXAMPLE 4

The PVDC precursor obtained in accordance with Example 2 was ground in a liquid suspension. 520 grams of PVDC were first mixed with 300 ml of DI water and ground for 20 minutes. A cooling time of 20 minutes was used and then 150 ml of ice were added to the mixture and ground for another 20 minutes. The process was repeated for a total of 8 times. After a total grinding of 180 minutes, the mixture was dried in air. This resulted in a narrow particle size distribution of 4–100 micrometers. The fine powder was pelletized to the following geometry and piece density:

TABLE 2

| Precursor Pellet | | | | |
| --- | --- | --- | --- | --- |
| Pellet # | Diameter (mm) | Length (mm) | Weight (g) | Density (g/cm$^3$) |
| 1 | 3.290 | 3.50 | 0.0356 | 1.14 |
| 2 | 3.300 | 3.44 | 0.0310 | 1.05 |
| 3 | 3.260 | 3.28 | 0.0300 | 1.10 |
| 4 | 3.260 | 3.30 | 0.0322 | 1.17 |
| 5 | 3.230 | 3.12 | 0.0305 | 1.19 |
| 6 | 3.240 | 3.16 | 0.0298 | 1.14 |

TABLE 2-continued

| Precursor Pellet | | | | |
| --- | --- | --- | --- | --- |
| Pellet # | Diameter (mm) | Length (mm) | Weight (g) | Density (g/cm$^3$) |
| 7 | 3.300 | 3.30 | 0.0314 | 1.11 |
| 8 | 3.190 | 3.29 | 0.0304 | 1.16 |
| 9 | 3.220 | 3.23 | 0.0315 | 1.20 |
| 10 | 3.210 | 3.39 | 0.0299 | 1.09 |
| Average | 3.250 | 3.30 | 0.0312 | 1.131 +/- 0.048 |

EXAMPLE 5

The precursor pellets from Example 3 were carbonized in a stream of nitrogen in a tube furnace. 408.9 grams of the pellets were placed in a quartz boat, 6 cm wide and 36 cm long, that was placed in a quartz tubing of 7 cm I.D. A stream of nitrogen at a flow rate of 630 cm$^3$/min was introduced through the tubing and passed through two scrubbers containing water and 20% KOH respectively. The following carbonization temperature program was used:

1. Increase temperature from 25 to 210° C. in 3 hours;
2. Hold the temperature at 210° C. for 5 hours;
3. Increase the temperature from 210 to 860° C. in 6.6 hours;
4. Hold the temperature at 860° C. for 2 hours; and
5. Decrease the temperature to 25° C.

After the temperature was down to 25° C., a carbon molecular sieve of 102.9 grams was obtained. The carbon sieve had a yield of 25.17%. The geometry and the piece density of the CMS pellet are shown as follows:

TABLE 3

| Carbon Molecular Sieve | | | | |
| --- | --- | --- | --- | --- |
| Pellet # | Diameter (mm) | Length (mm) | Weight (g) | Density (g/cm$^3$) |
| 1 | 2.10 | 2.00 | 0.0076 | 0.938 |
| 2 | 2.05 | 2.09 | 0.0073 | 1.058 |
| 3 | 2.00 | 2.01 | 0.0067 | 1.061 |
| 4 | 2.10 | 2.10 | 0.0068 | 0.935 |
| 5 | 2.010 | 1.95 | 0.0063 | 1.018 |
| 6 | 2.01 | 2.00 | 0.0070 | 1.103 |
| 7 | 2.00 | 2.00 | 0.0065 | 1.035 |
| 8 | 2.00 | 2.10 | 0.0069 | 1.046 |
| 9 | 2.10 | 2.10 | 0.0068 | 0.935 |
| 10 | 2.00 | 2.00 | 0.0069 | 1.098 |
| Average | 2.04 | 2.03 | 0.0068 | 1.023 +/- 0.062 |

EXAMPLE 6

291.1 grams of PVDC pellets prepared in accordance with Example 4 were carbonized in a tube furnace, as described in Example 5. However, because of the difference in PVDC precursors, a different carbonization temperature program was used:

1. Increase the temperature from 25 to 165° C. in 1.4 hours;
2. Increase the temperature from 165 to 175° C. in 1.6 hours;
3. Maintain the temperature at 175° C. for 3.0 hours;
4. Increase the temperature to 185° C. in 0.8 hour;
5. Maintain the temperature at 185° C. for 3 hours;
6. Increase the temperature from 185 to 210° C. in 0.4 hours;
7. Maintain the temperature at 210° C. for 3.0 hours;

8. Increase the temperature from 210 to 710° C. in 5.0 hours;
9. Maintain the temperature at 710° C. for 3.0 hours; and
10. Decrease the temperature from 710 to 25° C. in one hour.

76.5 grams of CMS (yield at 26.28%) were obtained with the following geometry and piece density:

TABLE 4

Carbon Molecular Sieve

| Pellet # | Diameter (mm) | Length (mm) | Weight (g) | Density (g/cm³) |
|---|---|---|---|---|
| 1 | 2.29 | 2.48 | 0.0092 | 0.901 |
| 2 | 2.29 | 2.48 | 0.0081 | 0.793 |
| 3 | 2.25 | 2.31 | 0.0078 | 0.849 |
| 4 | 2.22 | 2.49 | 0.0084 | 0.809 |
| 5 | 2.28 | 2.20 | 0.0077 | 0.857 |
| 6 | 2.25 | 2.25 | 0.0081 | 0.905 |
| 7 | 2.20 | 2.20 | 0.0073 | 0.873 |
| 8 | 2.23 | 2.36 | 0.0078 | 0.846 |
| 9 | 2.28 | 2.25 | 0.0079 | 0.860 |
| 10 | 2.21 | 2.42 | 0.0082 | 0.883 |
| Average | 2.25 | 2.34 | 0.0081 | 0.858 +/- 0.036 |

EXAMPLE 7

Using the procedure of Example 5, 290 grams of PVDC pellets prepared in accordance with Example 4 were carbonized in a tube furnace. The following carbonization temperature program was used:

1. Increase the temperature from 25 to 165° C. in 1.4 hours;
2. Increase the temperature from 165 to 175° C. in 1.6 hours;
3. Maintain the temperature at 175° C. for 3.0 hours;
4. Increase the temperature to 185° C. in 0.8 hour;
5. Maintain the temperature at 185° C. for 3 hours;
6. Increase the temperature from 185 to 210° C. in 0.4 hours;
7. Maintain the temperature at 210° C. for 3.0 hours;
8. Increase the temperature from 210 to 710° C. in 5.0 hours;
9. Maintain the temperature at 710° C. for 7.0 hours; and
10. Decrease the temperature from 710 to 25° C. in one hour.

75.1 grams of CMS were recovered at a carbonization yield of 25.89%. The geometry and the piece density were as follows:

TABLE 5

Carbon Molecular Sieve

| Pellet # | Diameter (mm) | Length (mm) | Weight (g) | Density (g/cm³) |
|---|---|---|---|---|
| 1 | 2.20 | 2.22 | 0.0079 | 0.936 |
| 2 | 2.20 | 2.21 | 0.0078 | 0.928 |
| 3 | 2.18 | 2.31 | 0.0078 | 0.905 |
| 4 | 2.21 | 2.32 | 0.0078 | 0.876 |
| 5 | 2.20 | 2.26 | 0.0079 | 0.920 |
| 6 | 2.20 | 2.31 | 0.0077 | 0.877 |
| 7 | 2.19 | 2.09 | 0.0074 | 0.940 |
| 8 | 2.28 | 2.27 | 0.0077 | 0.831 |
| 9 | 2.22 | 2.26 | 0.0083 | 0.949 |
| 10 | 2.21 | 2.08 | 0.0076 | 0.953 |
| Average | 2.21 | 2.23 | 0.0078 | 0.912 +/- 0.039 |

EXAMPLE 8

Using the procedure of Example 5, 278.3 grams of PVDC pellets prepared in accordance with Example 4 were carbonized in a tube furnace. The following carbonization temperature program was used:

1. Increase the temperature from 25 to 165° C. in 1.4 hours;
2. Increase the temperature from 165 to 175° C. in 1.6 hours;
3. Maintain the temperature at 175° C. for 3.0 hours;
4. Increase the temperature to 185° C. in 0.8 hour;
5. Maintain the temperature at 185° C. for 3 hours;
6. Increase the temperature from 185 to 210° C. in 0.4 hours;
7. Maintain the temperature at 210° C. for 3.0 hours;
8. Increase the temperature from 210 to 860° C. in 6.6 hours;
9. Maintain the temperature at 860° C. for 5.0 hours; and
10. Decrease the temperature from 860 to 25° C. in one hour.

69.8 grams of CMS were recovered at a carbonization yield of 25.08%. The geometry and the piece density were as follows:

TABLE 6

Carbon Molecular Sieve

| Pellet # | Diameter (mm) | Length (mm) | Weight (g) | Density (g/cm³) |
|---|---|---|---|---|
| 1 | 2.23 | 2.36 | 0.0077 | 0.835 |
| 2 | 2.23 | 2.28 | 0.0076 | 0.853 |
| 3 | 2.21 | 2.12 | 0.0072 | 0.885 |
| 4 | 2.22 | 2.10 | 0.0070 | 0.861 |
| 5 | 2.20 | 2.43 | 0.0079 | 0.855 |
| 6 | 2.18 | 2.20 | 0.0064 | 0.779 |
| 7 | 2.21 | 2.02 | 0.0065 | 0.839 |
| 8 | 2.18 | 2.38 | 0.0081 | 0.912 |
| 9 | 2.23 | 2.35 | 0.0083 | 0.904 |
| 10 | 2.25 | 2.25 | 0.0084 | 0.939 |
| Average | 2.21 | 2.25 | 0.0075 | 0.866 +/- 0.046 |

EXAMPLE 9

Carbon dioxide adsorption isotherms for the carbon molecular sieves prepared in the above examples were determined with a Micromeritics adsorption instrument (ASAP 2000). The Micromeritics ASAP 2000 is a volumetric instrument that provides accurate measurements on the equilibrium capacities of the sorbent material for the removal of carbon dioxide at various $CO_2$ vapor pressures.

For the measurement with the Micromeritics ASAP 2000 instrument, about 0.3 grams of the carbon molecular sieve were heated to 80° C. under vacuum for a period of 24 hours. The sample cell had a calibrated free space of 17.4115 mL. A low-pressure dose of 1.00 mL/g of $CO_2$ under STP was introduced to the sample cell. A final pressure of $CO_2$ was measured after an equilibrium was obtained, typically after 45 seconds. The change in pressure with a constant volume was used to compute the amount of $CO_2$ adsorbed under the testing condition.

Pore size distribution was also measured by the Horvath-Kawazoe equation supplied with the Micromeritics ASAP 2000 instrument.

Figure 1A:
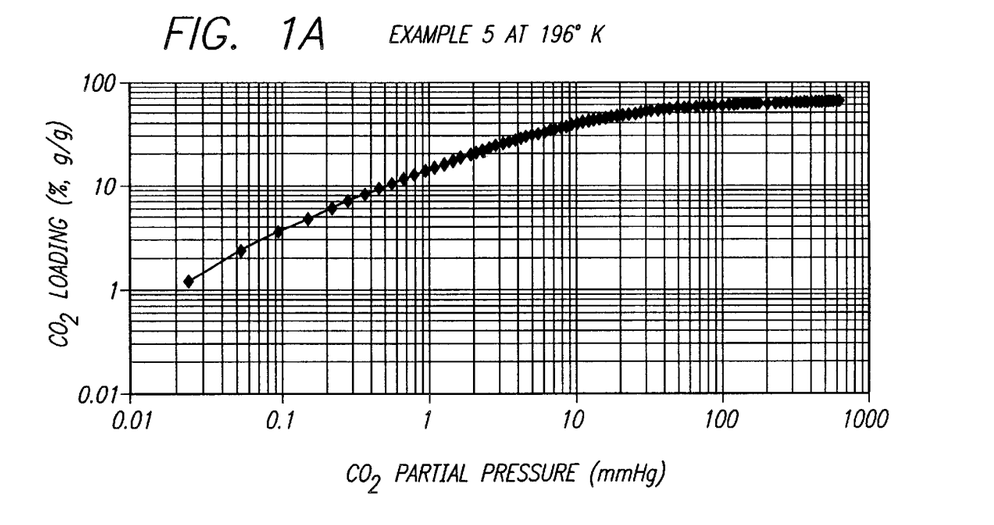
FIG. 1a is an adsorption isotherm graph for Example 5 of the present invention at 196° K.
Figure 1B:
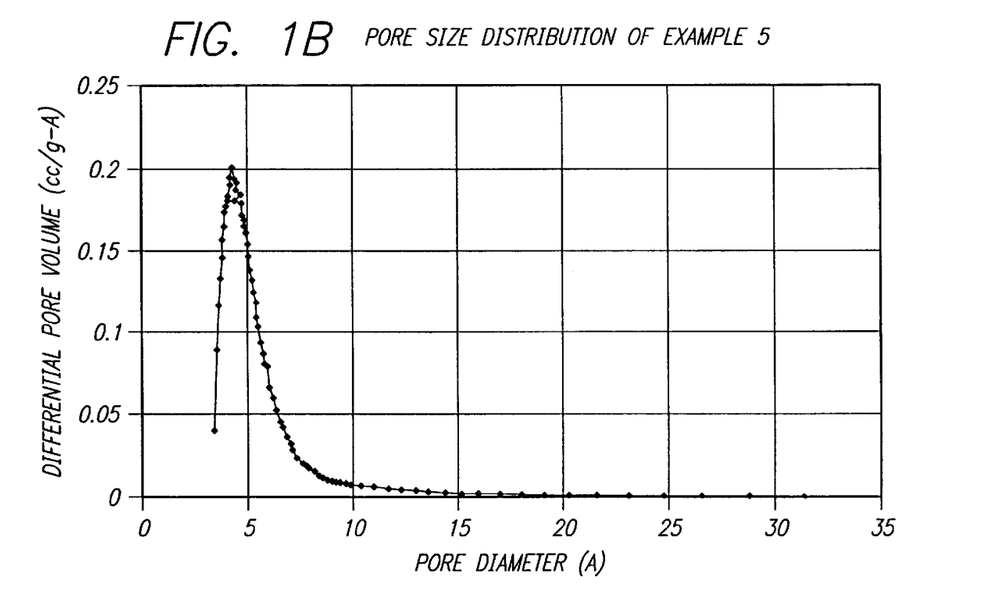
FIG. 1b is a pore size distribution graph for Example 5 of the present invention.

FIG. 1a shows the results of a $CO_2$ absorption isotherm measured at 196° K on the carbon molecular sieve prepared according to Example 5. FIG. 1b shows the pore size distribution of the CMS prepared according to Example 5.

EXAMPLE 10

Figure 2A:
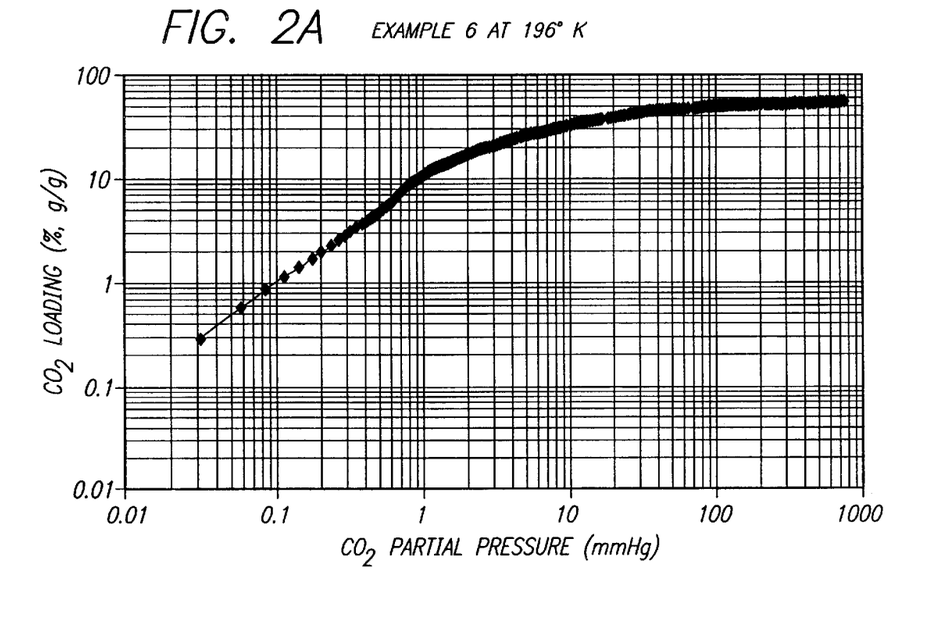
FIG. 2a is an adsorption isotherm graph for Example 6 of the present invention at 196° K.
Figure 2B:
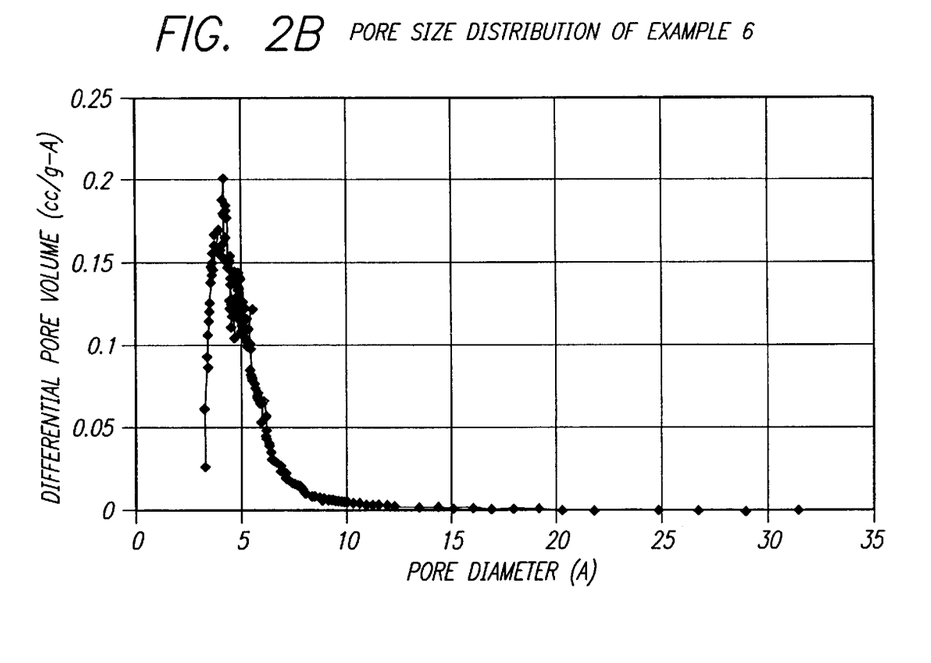
FIG. 2b is a pore size distribution graph for Example 6 of the present invention.

Using the procedures of Example 9, the $CO_2$ absorption and pore size distribution were measured for the CMS prepared in accordance with Example 6. FIG. 2a shows the isotherm and FIG. 2b shows the pore size distribution.

EXAMPLE 11

Figure 3A:
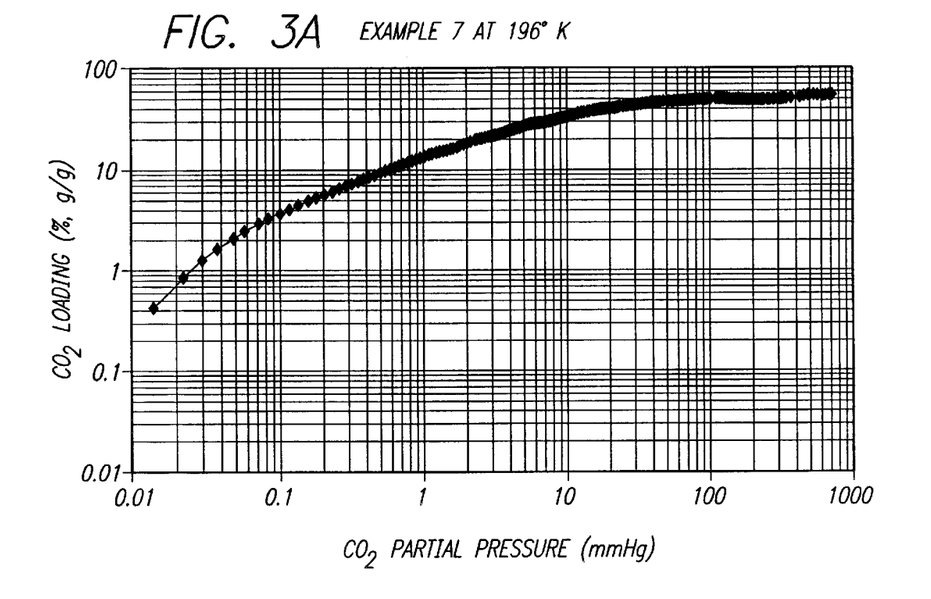
FIG. 3a is an adsorption isotherm graph for Example 7 of the present invention at 196° K.
Figure 3B:
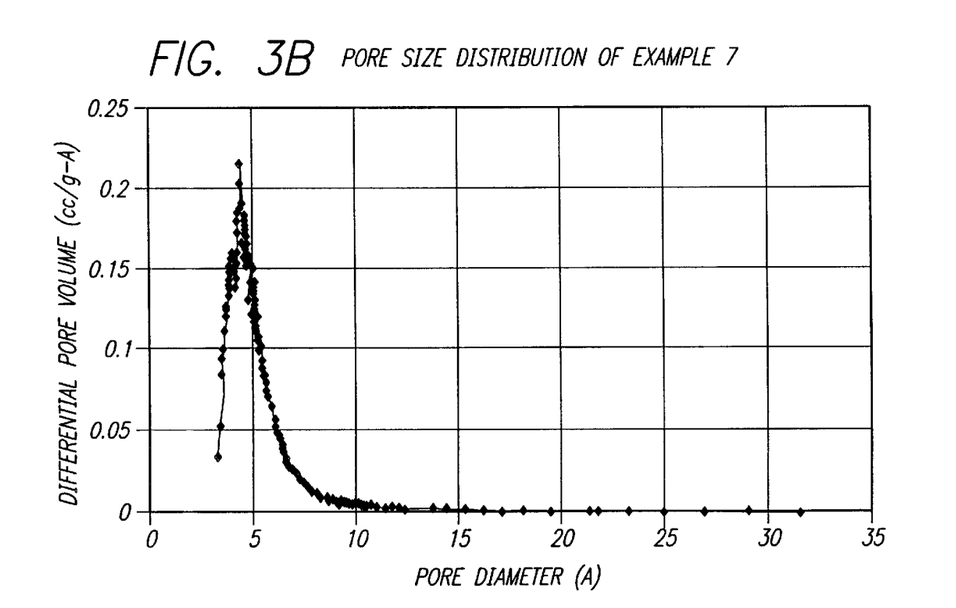
FIG. 3b is a pore size distribution graph for Example 7 of the present invention.

Using the procedures of Example 9, the $CO_2$ absorption and pore size distribution were measured for the CMS prepared in accordance with Example 7. FIG. 3a shows the isotherm and FIG. 3b shows the pore size distribution.

EXAMPLE 12

Figure 4A:
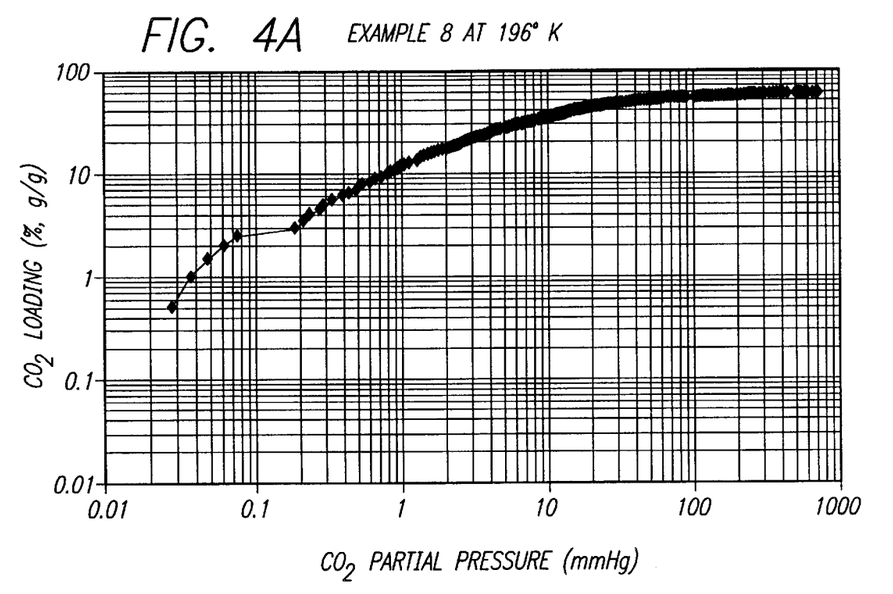
FIG. 4a is an adsorption isotherm graph for Example 8 of the present invention at 196° K.
Figure 4B:
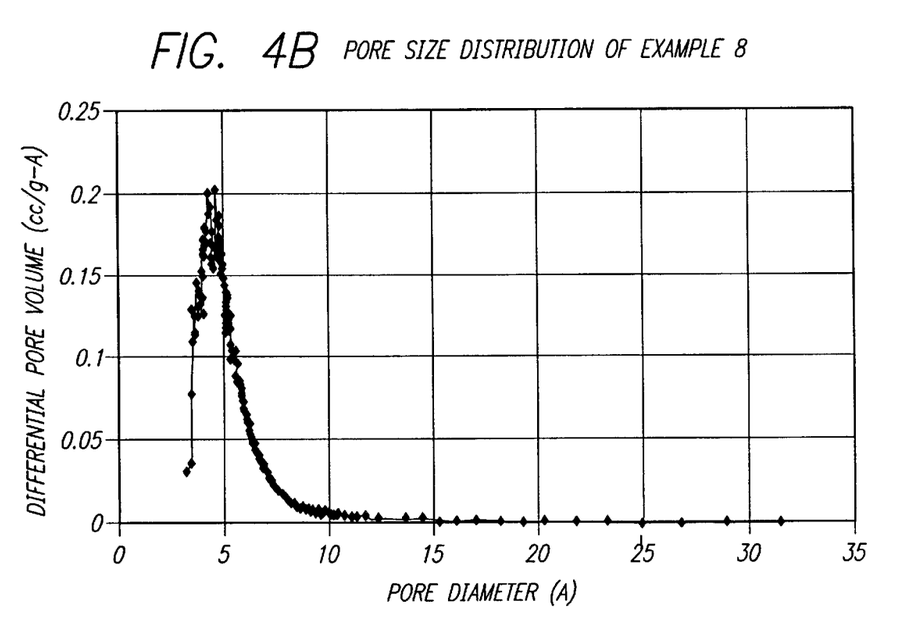
FIG. 4b is a pore size distribution graph for Example 8 of the present invention.

Using the procedures of Example 9, the $CO_2$ absorption and pore size distribution were measured for the CMS prepared in accordance with Example 8. FIG. 4a shows the isotherm and FIG. 4b shows the pore size distribution.

EXAMPLE 13

Using the procedure of Example 5, 269.8 grams of PVDC pellets prepared in accordance with Example 4 were carbonized in a tube furnace. The following carbonization temperature program was used:

1. Increase the temperature from 25 to 165° C. in 1.4 hours;
2. Increase the temperature from 165 to 175° C. in 1.6 hours;
3. Maintain the temperature at 175° C. for 3.0 hours;
4. Increase the temperature to 185° C. in 0.8 hour;
5. Maintain the temperature at 185° C. for 3 hours;
6. Increase the temperature from 185 to 210° C. in 0.4 hours;
7. Maintain the temperature at 210° C. for 3.0 hours;
8. Increase the temperature from 210 to 860° C. in 6.6 hours;
9. Maintain the temperature at 860° C. for 2.0 hours; and
10. Decrease the temperature from 860 to 25° C. in one hour.

68.5 grams of CMS were recovered at a carbonization yield of 25.39%.

Figure 5A:
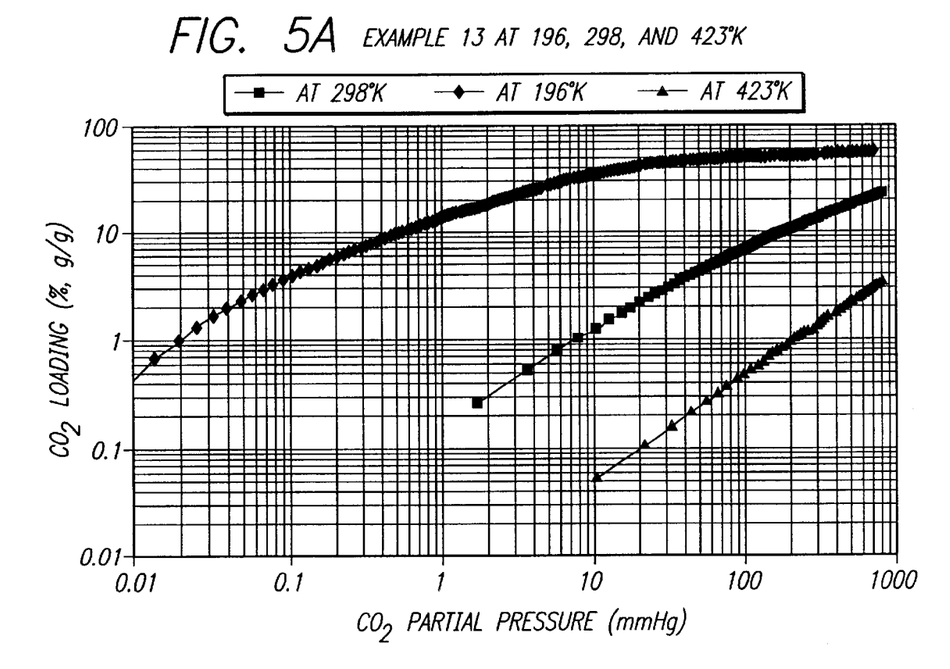
FIG. 5a are adsorption isotherm graphs for Example 13 of the present invention at 196, 298, and 423° K.
Figure 5B:
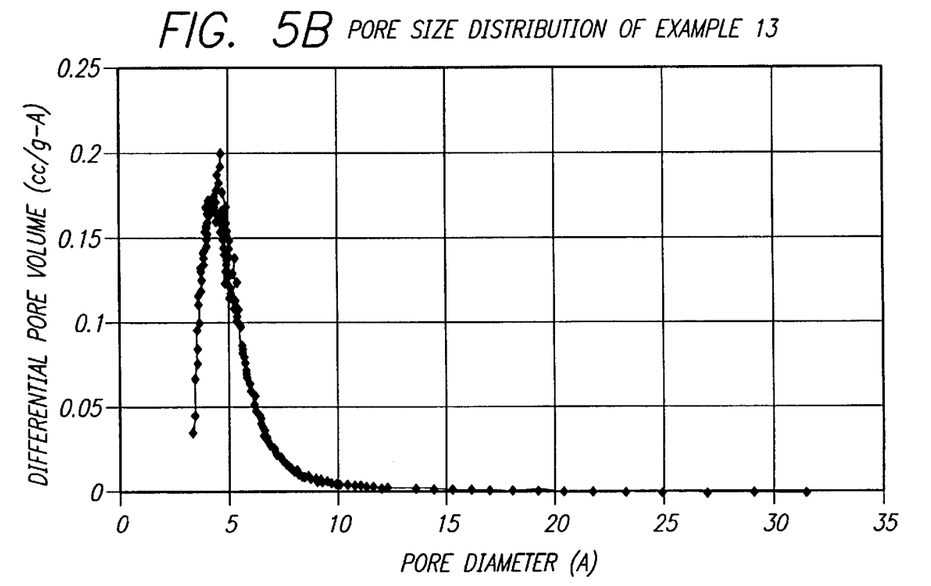
FIG. 5b is a pore size distribution graph for Example 13 of the present invention.

FIG. 5a shows the $CO_2$ isotherms of the resulting CMS measured at 196, 298 and 423° K. FIG. 5b shows the pore size distribution for the same CMS.

EXAMPLE 14

Figure 6A:
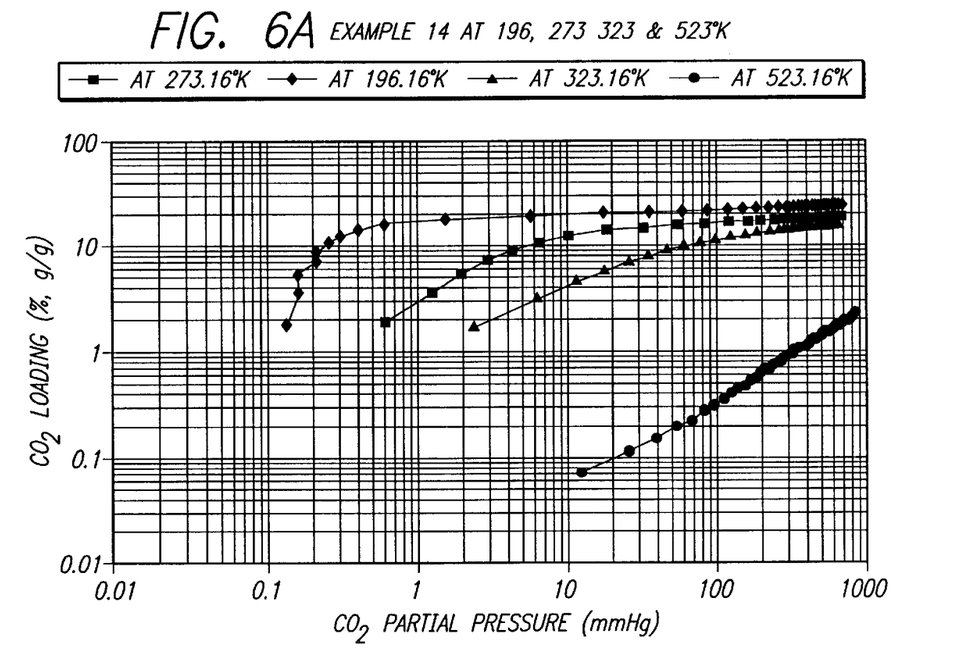
FIG. 6a are adsorption isotherm graphs for Example 14 using zeolite 5A at 196, 273, 323, and 523° K.
Figure 6B:
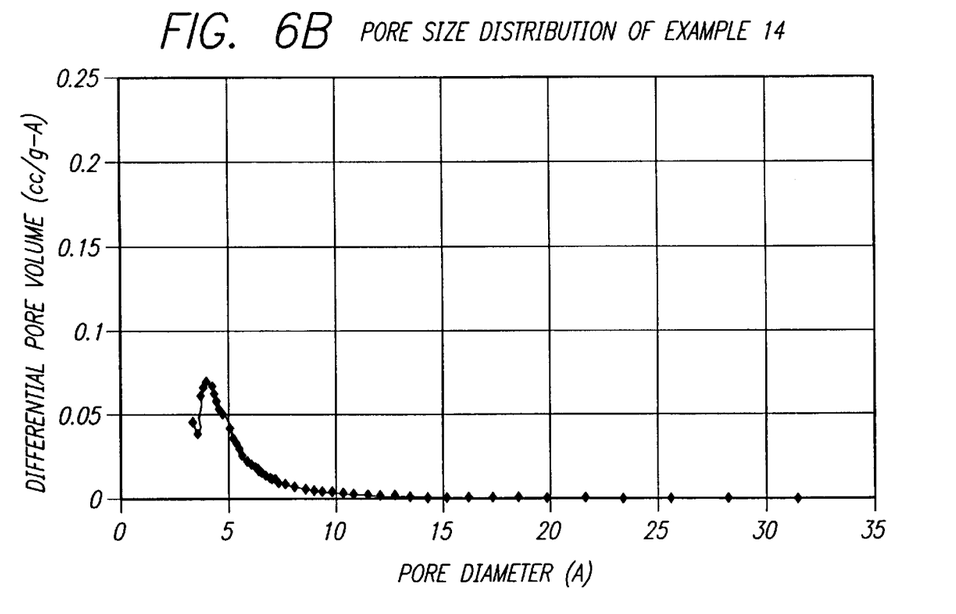
FIG. 6b is a pore size distribution graph for Example 14.

Using the procedures of Example 9, zeolite 5A was used in the place of CMS according to the present invention. FIG. 6a shows the $CO_2$ isotherms at 196, 273, and 523° K. FIG. 6b shows the pore size distribution for the same zeolite 5A.

Comparing the results from Examples 13 and 14 shows that the present invention has a superior working capacity (i.e., difference between capacities at adsorbing and desorbing conditions) for $CO_2$ acquisition on Mars. This is illustrated as follows:

TABLE 7

Capacities for $CO_2$ Acquisition on Mars

| Sorbent | Capacity (%, g/g) at 196° K. and 6 mmHg | Capacity (%, g/g) at 810 mmHg | Working Capacity (%, g/g) |
|---|---|---|---|
| Example 13 | 30.3 | 3.2 (at 423° K.) | 27.1 |
| Zeolite 13X | 13 | 2 (at 523° K.) | 11 |
| Example 14 | 19.8 | 2.1 (at 523° K.) | 17.7 |

EXAMPLE 15

Using the procedure of Example 9, $CO_2$ isotherms for the CMS prepared in accordance with Examples 5–8, 13 and 14 were determined with a Micromeritics adsorption instrument (ASAP 2000) at 196° K. From the absorption data, the surface area of each CMS was calculated based on the BET and Langmuir equations. The total micropore volume and the pore size distribution were computed with the Horvath-Kawazoe equation supplied with the instrument. These structure data are summarized as follows:

TABLE 8

Characteristics at 6 mmHg $CO_2$ and 196° K.

| Example | BET surface area ($m^2$/g) | Langmuir surface area ($m^2$/g) | Total pore volume ($cm^3$/g) | Median pore diameter (nm) | $CO_2$ capacity (%, g/g at 6 mmHg) |
|---|---|---|---|---|---|
| 5 | 1150 | 1407 | 0.580 | 0.439 | 32.6 |
| 6 | 1064 | 1271 | 0.525 | 0.447 | 28.6 |
| 7 | 1064 | 1271 | 0.531 | 0.443 | 29.4 |
| 8 | 1115 | 1339 | 0.556 | 0.453 | 29.3 |
| 13 | 1101 | 1308 | 0.547 | 0.445 | 30.3 |
| 14 | 397 | 555 | 0.235 | 0.420 | 19.8 |

It should be understood, of course, that the foregoing relates to preferred embodiments of the invention and that modifications may be made without departing from the spirit and scope of the invention as set forth in the following claims.

What is claimed is:

1. A carbon dioxide adsorbent, comprising:
   a carbonized precursor material, such that said adsorbent is characterized by a weight that is from about 0.0063 to 0.0092 g, a total micropore volume from about 0.525 to 0.580 $cm^3$/g and a median pore diameter from about 0.439 to 0.453 nm, and
   whereby said adsorbent has a carbon dioxide capacity of at least about 28.6% g/g at a carbon dioxide partial pressure of about 6 mm Hg and a temperature of about 196° K.

2. The adsorbent of claim 1, wherein said material is further characterized by a BET surface area of at least about 1064 $m^2$/g.

3. The adsorbent of claim 1, wherein said material is further characterized by a Langmuir surface area of at least about 1271 $m^2$/g.

4. A carbon dioxide adsorbent, comprising:
   a carbonized, shaped precursor material characterized by an absence of a cross-linking agent, and a length to diameter ratio of about 1 in a non-carbonized state,
   whereby said adsorbent is characterized by a BET surface area not greater than about 1150 $m^2$/g, a Langmuir surface area not greater than about 1407 $m^2$/g, a total micropore volume not greater than about 0.580 $cm^3$/g, a median pore diameter not greater than about 0.453 nm, and a carbon dioxide capacity of at least about 28.6% g/g at a carbon dioxide partial pressure of about 6 mm Hg and a temperature of about 196° K.

5. The adsorbent of claim 4, wherein said BET surface area is about 1150 $m^2$/g.

6. The adsorbent of claim 4, wherein said Langmuir surface area is about 1407 $m^2$/g.

7. The adsorbent of claim 4, wherein said total micropore volume is about 0.580 $cm^3$/g.

8. The adsorbent of claim 4, wherein said median pore diameter is about 0.453 nm.

9. A carbon dioxide adsorbent, comprising:
   a carbonized precursor material characterized by a particle size between about 4 to about 100 micrometers in a non-carbonized state,
   whereby said adsorbent is characterized by a BET surface area between about 1064 to 1150 $m^2/g$, a Langmuir surface area between about 1271 to 1407 $m^2/g$, a total micropore volume between about 0.525 to 0.580 $cm^3/g$, a median pore diameter between about 0.439 to 0.443 nm, and a carbon dioxide capacity of at least about 28.6% g/g at a carbon dioxide partial pressure of about 6 mm Hg and a temperature of about 196° K.

10. The adsorbent of claim 9, wherein said material is further characterized by a total micropore volume of about 0.580 $cm^3/g$.

11. The adsorbent of claim 9, wherein said material is further characterized by a median pore diameter of about 0.439 nm.

12. The adsorbent of claim 9, wherein said material has a carbon dioxide capacity of about 32.6% g/g at a carbon dioxide partial pressure of about 6 mm Hg.

13. The adsorbent of claim 9, wherein said material is further characterized by a BET surface area of at least about 1064 $m^2/g$.

14. The adsorbent of claim 9, wherein said material is further characterized by a Langmuir surface area of at least about 1271 $m^2/g$.

15. A method of making a carbon dioxide adsorbent, comprising the step of:
   polymerizing a monomer to produce a precursor material in the absence of a cross-linking agent; and
   heating said precursor material in a stepped fashion;
   carbonizing said shaped precursor material to produce said adsorbent,
   whereby said adsorbent is characterized by a weight that is from 0.0063 to 0.0092 g, a total micropore volume of at least about 0.525 $cm^3/g$, a median pore diameter between about 0.439 to 0.443 nm, and a carbon dioxide capacity of at least about 28.6% g/g at a carbon dioxide partial pressure of about 6 mm Hg and a temperature of about 196° K.

16. The method of claim 15, wherein the step of polymerizing comprises one of the steps of suspension polymerization and bulk polymerization.

17. The method of claim 15, wherein said monomer is characterized by being essentially free of oxygen in its molecular structure and comprised of hydrogen, a halogen and carbon.

18. The method of claim 15, wherein the step of carbonization comprises the step of heating said shaped precursor material in the presence of an inert gas.

19. A method of making a carbon dioxide adsorbent, comprising the step of:
   polymerizing a monomer in the absence of a cross-linking agent to produce a precursor material characterized by a particle size between about 4 to about 100 micrometers;
   shaping said precursor material to produce a shaped precursor material characterized by a length to diameter ratio of about 1;
   heating said shaped precursor material in a stepped fashion,
   carbonizing said shaped precursor material to produce said adsorbent,
   whereby said adsorbent is characterized by a BET surface area between about 1064 to 1150 $m^2/g$, a Langmuir surface area between about 1271 to 1407 $m^2/g$, a total micropore volume between about 0.525 to 0.580 $cm^3/g$, a median pore diameter between about 0.439 to 0.443 nm, and a carbon dioxide capacity of at least about 28.6% g/g at a carbon dioxide partial pressure of about 6 mm Hg and a temperature of about 196° K.

20. The method of claim 19, wherein said monomer is selected from the group consisting of acrylonitrile, vinylidene fluoride, chlorotrifluoroethylene, vinylidene chloride, mixtures of the foregoing, vinyl fluoride, vinyl bromide, chlorinated ethylene, chlorofluorinated ethylene, vinyl-chlorobenzene, vinylidene bromide and vinylidene-flouride-chlorotrifluoroethylene.

21. The method of claim 19, wherein the step of polymerizing occurs in the presence of a cross-linking agent and said cross-linking agent is selected from the group consisting of divinyl-benzene, trivinyl benzene, divinyl acetylene, and divinyl sulfide.

22. The method of claim 19, wherein the step of carbonization comprises the step of heating said shaped precursor material at a temperature between about 25 to 860° C.

23. The method of claim 19, wherein said adsorbent is in the form of carbon molecular sieves and said sieves are characterized by a density between about 0.935 to 1.098 $g/cm^3$.

24. The method of claim 19, wherein said adsorbent is in the form of carbon molecular sieves and said sieves are characterized by a weight between about 0.0063 to 0.0076 g.

25. The method of claim 19, wherein said adsorbent is in the form of carbon molecular sieves and said sieves are characterized by a diameter between about 2.00 to 2.10 nm.

26. The method of claim 19, wherein said adsorbent is in the form of carbon molecular sieves and said sieves are characterized by a length between about 1.95 to 2.10 nm.

* * * * *